(12) United States Patent
Johari

(10) Patent No.: US 11,182,045 B2
(45) Date of Patent: Nov. 23, 2021

(54) MODIFYING APPLICATION ICONS BASED ON USAGE DATA OF THE APPLICATIONS

(71) Applicant: International Business Machines Corporation, Armonk, NY (US)

(72) Inventor: Iman Johari, Coquitlam (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 16/270,754

(22) Filed: Feb. 8, 2019

(65) Prior Publication Data

US 2020/0257432 A1    Aug. 13, 2020

(51) Int. Cl.
*G06F 3/0481* (2013.01)
*G06F 3/0484* (2013.01)

(52) U.S. Cl.
CPC ...... *G06F 3/04817* (2013.01); *G06F 3/04845* (2013.01)

(58) Field of Classification Search
CPC ............. G06F 3/04817; G06F 3/04845; G06F 3/0483; G06F 21/36; H04M 1/72472
See application file for complete search history.

(56) References Cited

U.S. PATENT DOCUMENTS

| | | |
|---|---|---|
| 6,668,177 B2 | 12/2003 | Salmimaa et al. |
| 8,037,421 B2 | 10/2011 | Scott et al. |
| 9,378,467 B1 | 6/2016 | Chaiyochlarb et al. |
| 2012/0192111 A1* | 7/2012 | Hsu ..................... G06F 3/04817 715/821 |
| 2012/0297342 A1* | 11/2012 | Jang .................... G06F 3/04817 715/823 |
| 2013/0076774 A1 | 3/2013 | Yu et al. |

(Continued)

OTHER PUBLICATIONS

Anonymous, "A system and method to determine and display a list of time-based short-cut icons in mobile system" An IP.com Prior Art Database Technical Disclosure, IP.com No. IPCOM000208632D, Jul. 14, 2011. 3 pages.

(Continued)

*Primary Examiner* — Kavita Stanley
*Assistant Examiner* — Bille M Dahir
(74) *Attorney, Agent, or Firm* — Cantor Colburn LLP; Steven Bouknight

(57) ABSTRACT

In one example implementation according to aspects of the present disclosure, a computer-implemented method includes, in response to receiving usage information for each application in a set of applications associated with a mobile device, identifying the usage information per application within predetermined time intervals. The method further includes determining a relative order of each application within each of a plurality of application categories using predetermined ranges of the predetermined time intervals that a respective application was used. The method further includes, in response to determining a particular time of day, modifying a size of icons for display relative to other icons for applications within the application category to highlight applications within the application category according to the relative order. The method further includes displaying, on a display, icons of the set of applications within the application category using a modified size.

15 Claims, 5 Drawing Sheets

(56) References Cited

U.S. PATENT DOCUMENTS

| | | | |
|---|---|---|---|
| 2013/0152001 A1* | 6/2013 | Lovitt | G06F 3/0482 715/765 |
| 2014/0201655 A1 | 7/2014 | Mahaffey et al. | |
| 2014/0324873 A1* | 10/2014 | Lee | G06F 9/451 707/740 |
| 2016/0117079 A1* | 4/2016 | Huang | G06F 3/0483 715/738 |

OTHER PUBLICATIONS

Anonymous, "A smart way to sort and display application icons on mobile devices" An IP.com Prior Art Database Technical Disclosure, IP.com No. IPCOM000248707D, Dec. 28, 2016. 5 pages.

* cited by examiner

MODIFYING APPLICATION ICONS BASED ON USAGE DATA OF THE APPLICATIONS

BACKGROUND

The present invention generally relates to processing systems, and more specifically, to modifying application icons based on usage data of the applications.

Processing systems, such as smartphones, laptops, tablet computers, wearable computing devices, and the like, include displays for displaying information. Processing systems execute applications to perform various functions and tasks. For example, if a user desires to play music, the user opens a music application to cause the music to play. If a user desires to drive to a location, the user opens a mapping/navigation application to enter an address and receive navigation instructions, for example. Many different types of applications exist for performing various functions such as these and others. As a result, users' processing systems often include dozens (or more) applications.

SUMMARY

Embodiments of the present invention are directed to a computer-implemented method for modifying application icons based on usage data of the applications.

A non-limiting example of the computer-implemented method includes, in response to receiving usage information for each application in a set of applications associated with a mobile device, identifying, by a processing device of a processing system, the usage information per application within predetermined time intervals. The method further includes determining, by the processing device, a relative order of each application within each of a plurality of application categories using predetermined ranges of the predetermined time intervals that a respective application was used. The method further includes, in response to determining a particular time of day, modifying, by the processing device, a size of icons for display relative to other icons for applications within the application category to highlight applications within the application category according to the relative order. The method further includes displaying, on a display of the processing system, icons of the set of applications within the application category using a modified size.

Embodiments of the present invention are directed to a system. A non-limiting example of the system includes a memory comprising computer readable instructions and a processing device for executing the computer readable instructions for performing a method for modifying application icons based on usage data of the applications.

Embodiments of the invention are directed to a computer program product. A non-limiting example of the computer program product includes a computer readable storage medium having program instructions embodied therewith. The program instructions are executable by a processor to cause the processor to perform a method for modifying application icons based on usage data of the applications.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
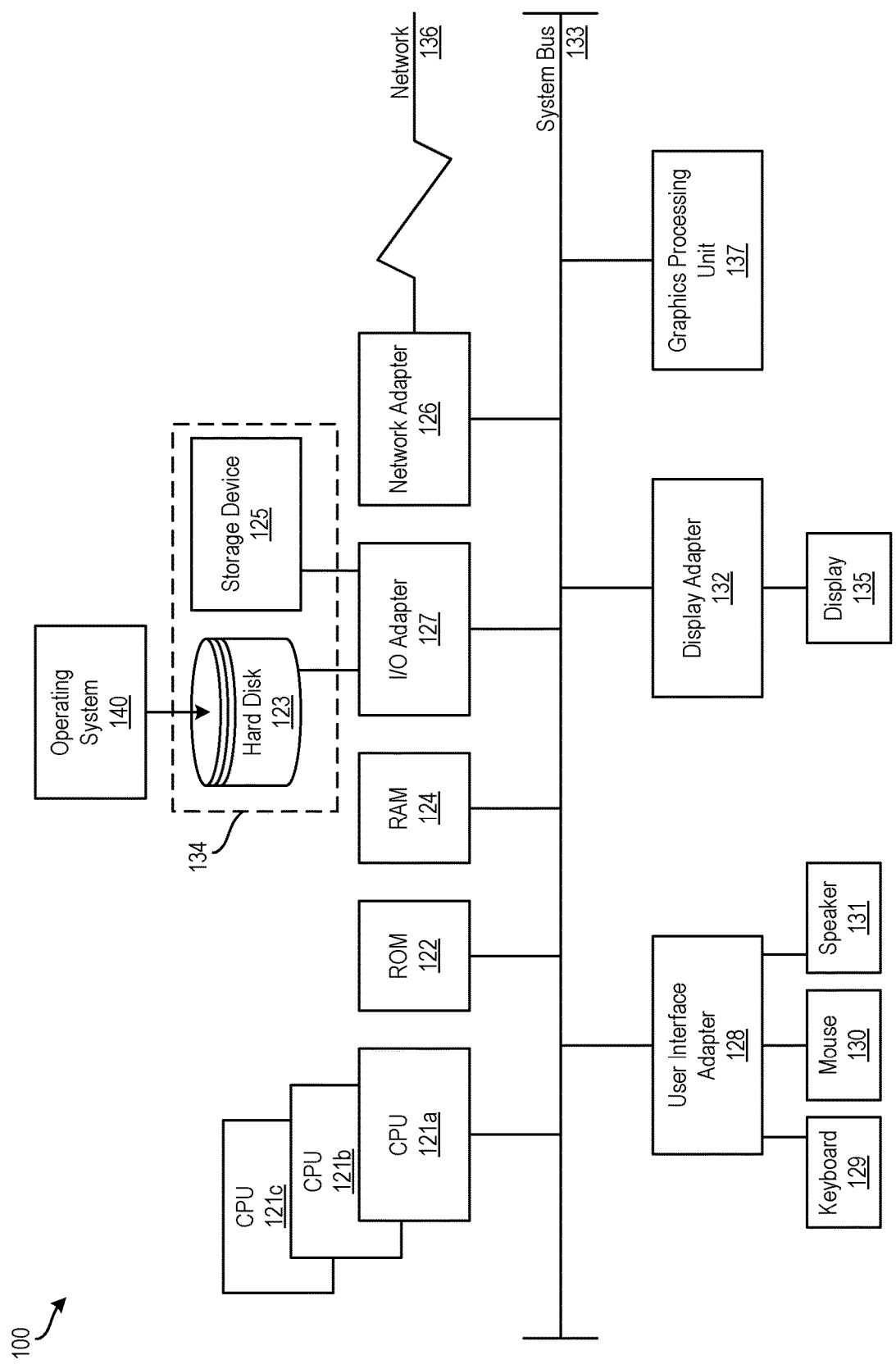
FIG. 1 depicts a block diagram of a processing system for implementing the presently described techniques according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood that the present disclosure is capable of being implemented in conjunction with any other type of computing environment now known or later developed. For example, FIG. 1 depicts a block diagram of a processing system 100 for implementing the techniques described herein. In examples, processing system 100 has one or more central processing units (processors) 121a, 121b, 121c, etc. (collectively or generically referred to as processor(s) 121 and/or as processing device(s)). In aspects of the present disclosure, each processor 121 can include a reduced instruction set computer (RISC) microprocessor. Processors 121 are coupled to system memory (e.g., random access memory (RAM) 124) and various other components via a system bus 133. Read only memory (ROM) 122 is coupled to system bus 133 and may include a basic input/output system (BIOS), which controls certain basic functions of processing system 100.

Further depicted are an input/output (I/O) adapter 127 and a network adapter 126 coupled to system bus 133. I/O adapter 127 may be a small computer system interface (SCSI) adapter that communicates with a hard disk 123 and/or a storage device 125 or any other similar component. I/O adapter 127, hard disk 123, and storage device 125 are collectively referred to herein as mass storage 134. Operating system 140 for execution on processing system 100 may be stored in mass storage 134. The network adapter 126 interconnects system bus 133 with an outside network 136 enabling processing system 100 to communicate with other such systems.

A display (e.g., a display monitor) 135 is connected to system bus 133 by display adapter 132, which may include a graphics adapter to improve the performance of graphics intensive applications and a video controller. In one aspect of the present disclosure, adapters 126, 127, and/or 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 may be interconnected to system bus 133 via user interface adapter 128, which may include, for example, a Super I/O chip integrating multiple device adapters into a single integrated circuit.

In some aspects of the present disclosure, processing system 100 includes a graphics processing unit 137. Graphics processing unit 137 is a specialized electronic circuit designed to manipulate and alter memory to accelerate the creation of images in a frame buffer intended for output to a display. In general, graphics processing unit 137 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 121, storage capability including system memory (e.g., RAM 124), and mass storage 134, input means such as keyboard 129 and mouse 130, and output capability including speaker 131 and display 135. In some aspects of the present disclosure, a portion of system memory (e.g., RAM 124) and mass storage 134 collectively store the operating system 140 such as the AIX® operating system from IBM Corporation to coordinate the functions of the various components shown in processing system 100.

Turning now to an overview of technologies that are more specifically relevant to aspects of the invention, the techniques described herein provide for modifying application icons on a display of a processing system based on usage data of the applications. A user of a processing system (e.g., a smartphone, laptop, tablet computer, etc.) may have dozens (or more) applications installed for performing various tasks. The user uses some of these applications throughout the day and/or at certain times during the day. For example, a user checks his/her email (using an email application) first thing in the morning and then checks a social media service (using a social media application). Later, on the user's way to work, the user listens to music (using a music application) and checks traffic conditions (using a navigation application). During lunch, the user checks news (using a news application). After work, the user exercises and tracks his/her exercise (using a fitness application) while listening to music (using the music application). In the evening, the user listens to an audiobook (using an audio book application) while online dating (using an online dating application). This is merely an example intended to indicate the variety of applications that a user uses throughout the day. Moreover, as is evident from this example, the user uses different types of applications at different times throughout the day.

In some examples, a user has multiple applications within a category. Examples of categories include music, travel, news, business, productivity, finance, games, social media, etc. For example, the user may use multiple music-type applications to listen to music, multiple travel-type applications when traveling, multiple news-type applications to check the news, and the like.

With the number of applications ever increasing, the present techniques provide techniques to visually aid the user to choose an application based on usage data. The usage data is indicative of user habits and behaviors throughout the day and tracks which applications are used, when, and for how long. The usage data can include different or other information indicative of when and how a user uses an application.

Turning now to an overview of the aspects of the invention, one or more embodiments of the invention address the above-described shortcomings of the prior art by providing techniques for modifying application icons based on usage data of the applications. Some processing systems, such as smartphones, have relatively small displays and can display only a limited number of application icons at a time. The number of application icons that can be displayed is often less than the number of installed applications (and thus application icons). Although some phones enable more frequently used applications to be displayed in place of less frequently used application, this approach fails to account for what time of day a user uses the application(s).

The above-described aspects of the invention address the shortcomings of the prior art by tracking usage data about when a user uses the various applications on the user's processing system and modifies (i.e., a size, a position, etc.) the application icons associated with the applications to draw the user's attention to the application that the user typically uses at a certain time. This can be accomplished by modifying the icon size of the application icon on the display. For example, icons for more frequently used application are enlarged relative to a standard icon size while icons for less frequently used applications are reduced relative to the standard icon size. Icons can also be rearranged based on usage data, based on the changes to the icon size of the application icons, and the like. In this way, more frequently used applications with larger associated application icons are easier to identify for the user. By accounting for usage based on different times of day (or even different days of the week (e.g., weekday versus weekend)), a user can more easily identify and access applications that are used at respective times.

Figure 2:
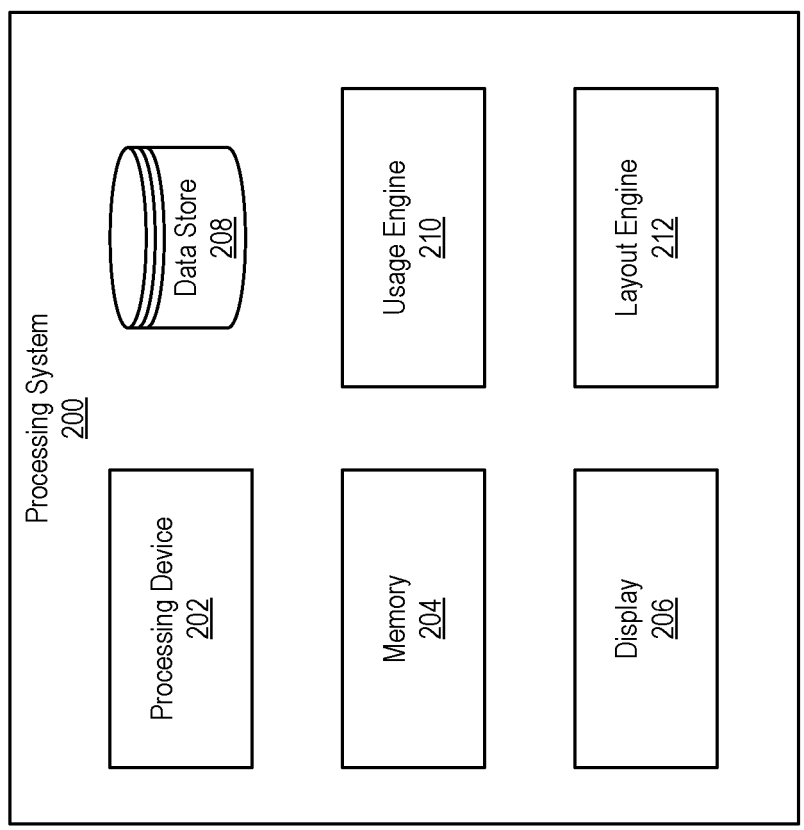
FIG. 2 depicts a block diagram of a processing system for modifying application icons based on usage data of the applications according to one or more embodiments described herein.

Turning now to a more detailed description of aspects of the present invention, FIG. 2 depicts a block diagram of a processing system 200 for modifying application icons based on usage data of the applications according to one or more embodiments described herein. The processing system 200 includes a processing device 202, a memory 204, a display 206, a data store 208, a usage engine 210, and a layout engine 212.

The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus a system memory (e.g., memory 204) can store program instructions that when executed by the processing device 202 implement the engines described herein. Other engines can also be utilized to include other features and functionality described in other examples herein.

The usage engine 210 collects usage data about the usage of applications running on the processing system 200. Usage data is collected on a per-application basis (i.e., usage data is collected for each application). Usage data indicates when and how the application is used, such as what time of day and/or day of week the application is opened and/or closed, how long the application is used, where the application is used (e.g., the user opens a music application while in his/her vehicle, the user opens an email application at work), and the like. The usage engine 210 orders (i.e., ranks) each application installed on the processing system 200 within time intervals (e.g., one-hour time interval, two-hour time interval, half-hour time interval, etc.). For example, during the time interval from 9:00 am to 10:00 am, if Application A is used 7 minutes, Application B is used 9 minutes, and Application C is used 1 minute, the applications are ordered as follows from most to least used: Application B, Application A, Application C. The usage engine 210 stores usage data, for example, in the data store 208.

The layout engine 212 determines a size of application icons for the applications that are displayed on the display 206 using the order determined by the layout engine 212. For example, in the case of the order of Application B, Application A, Application C for the time interval from 9:00 am to 10:00 am, the layout engine 212 associates an icon size with each application icon for the applications Application A, Application B, and Application C. In this example, the size of the icon for Application B is larger than the icon for Application A, which is larger than the icon for Application C. According to one or more embodiments described herein, the size can be proportional to the usage data. For example, if Application B is used 50% more (e.g., more often, longer use, etc.) than Application A, the icon for Application B is modified by the layout engine 212 to appear 50% larger than the icon for Application A.

The layout engine 212 uses a current time of day to determine how to modify the size of the icons for the applications within application categories. For example, the layout engine 212 queries a clock (not shown) to determine a current time of day (e.g., 7:49 pm). The layout engine 212 then modifies a size of icons for applications within an application category according to the relative order determined for the applications within the category for an interval that includes the current time of day. For example, for social media applications during a time interval from 7:00 pm until 9:00 pm, a user historically uses, as determined by the usage engine 210, Application D more than Application E and Application F, which are both used approximately equally. In this example, the layout engine 212 modifies a size of the icon for Application D and/or modifies a size of the icons for Application E and Application F so that the icon for Application D appears larger than the icons for Application E and Application F.

The layout engine 212 can also change the relative location on the display 206 that the icons for applications are displayed. For example, an icon for the more frequently used Application D appears in a more prominent position than the icons for the less frequently used Application E and Application F.

In examples, the layout engine 212 uses a minimum size value and/or a maximum size value to constrain the size of the icons. For example, icons may be limited to a particular pixel size. In the case of the layout engine 212 increasing an icon size, the size may be limited to a maximum icon size (e.g., no more than 200 pixels by 300 pixels, etc.). In the case of the layout engine 212 decreasing an icon size, the size may be limited to a minimum icon size limit (e.g., no less than 50 pixels by 50 pixels, etc.). The size can also be limited to a certain ratio compared to icons of other sizes (e.g., an icon for an application within a category is limited to be 50% larger than an icon for another application within the category, etc.).

Figure 3:
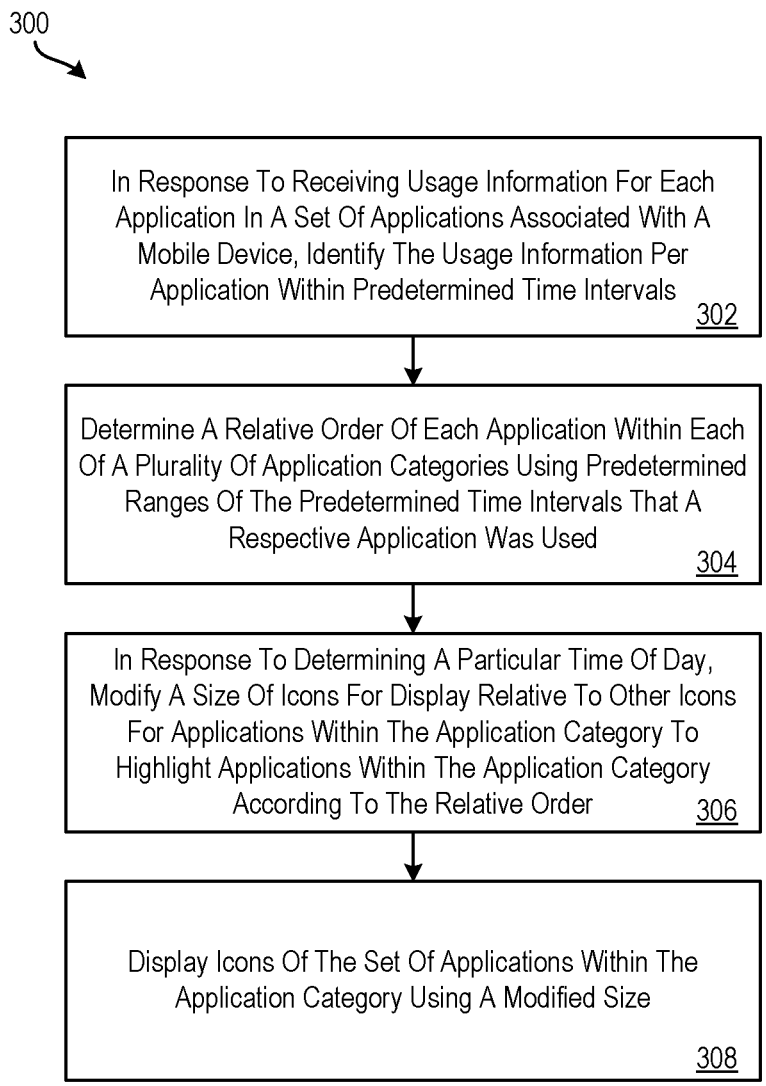
FIG. 3 depicts a flow diagram of a method for modifying application icons based on usage data of the applications according to one or more embodiments described herein.

FIG. 3 depicts a flow diagram of a method 300 for modifying application icons based on usage data of the applications according to one or more embodiments described herein. The method 300 can be performed by any suitable processing system (e.g., the processing system 100, the processing system 200, a cloud computing environment, etc.) and/or processing device (e.g., the processing device 121, the processing device 202, etc.).

At block 302, the usage engine 210 identifies, in response to receiving usage information for each application in a set of applications associated with a mobile device (e.g., the processing system 200), the usage information per application within predetermined time intervals At block 304, the usage engine 210 determines a relative order of each application within each of the plurality of application categories using predetermined ranges of the predetermined time internals that a respective application was used.

At block 306, the layout engine 212 modifies, in response to determining a particular time of day, a size of icons for display relative to other icons for applications within the application category to highlight applications within the application category according to the relative order.

At block 308, the layout engine 212 displays, on the display 206, icons of the set of applications within the category using a modified size.

Additional processes also may be included, and it should be understood that the process depicted in FIG. 3 represents an illustration, and that other processes may be added or existing processes may be removed, modified, or rearranged without departing from the scope and spirit of the present disclosure.

Figure 4B:
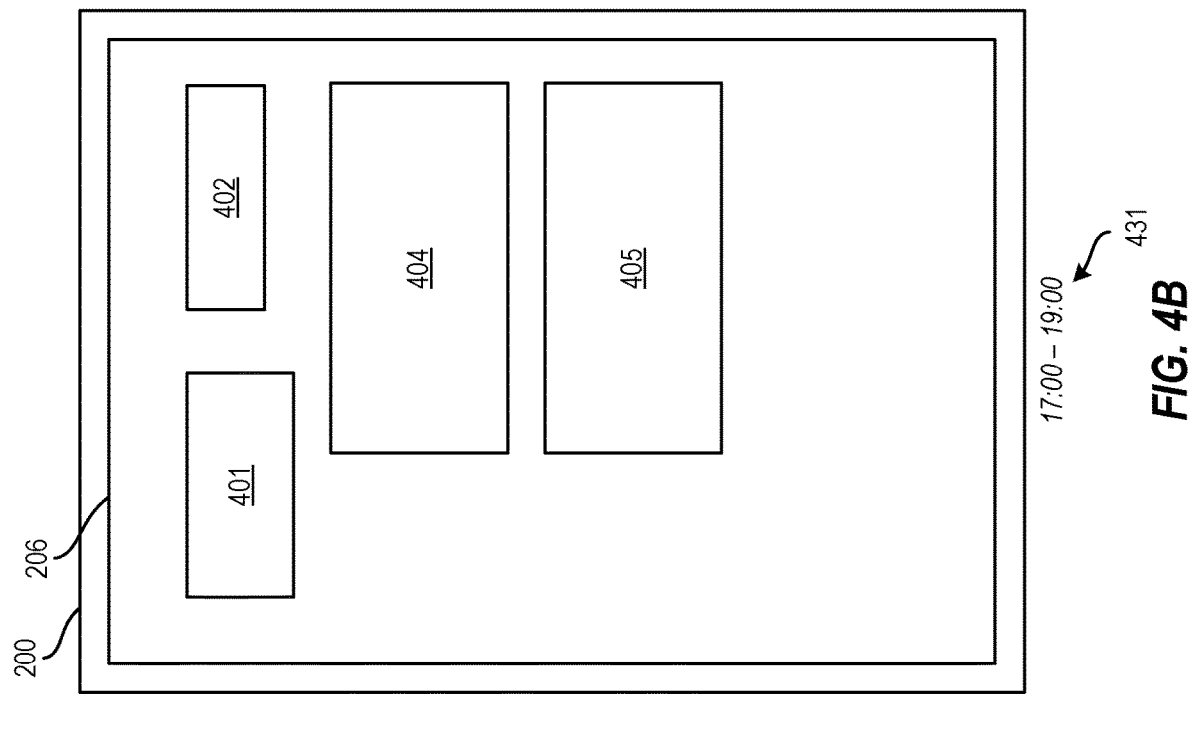
FIG. 4B depicts application icons displayed on the display of the processing system of FIG. 2 during a second time interval according to one or more embodiments described herein.
Figure 4A:
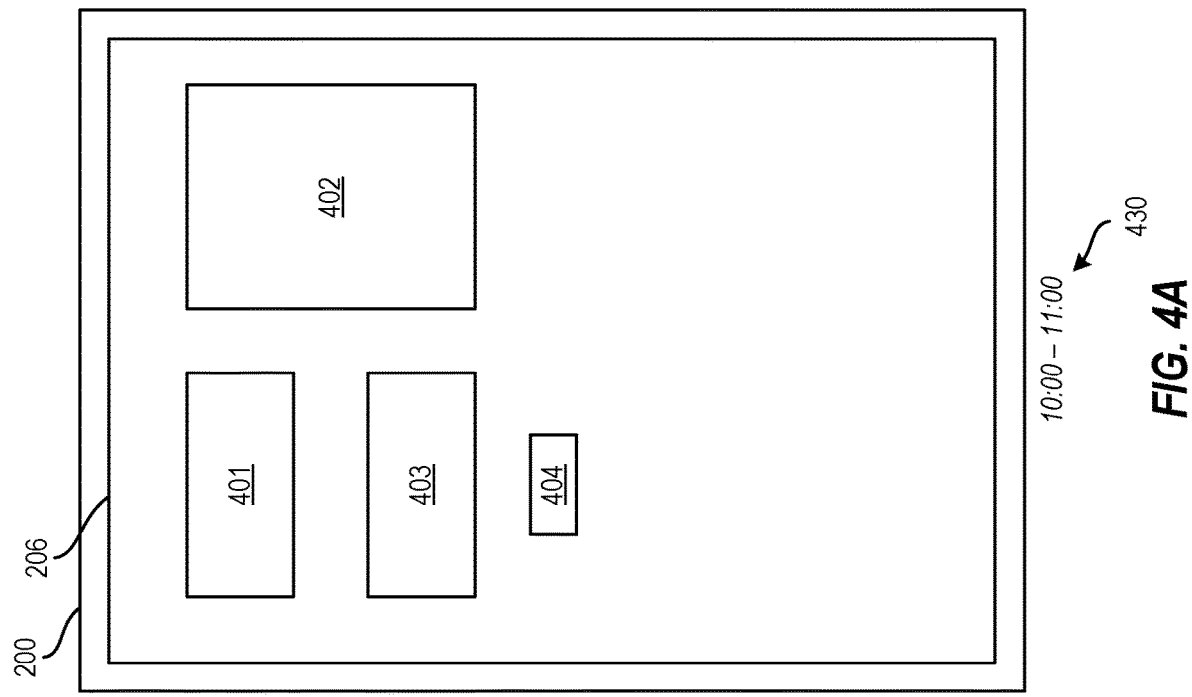
FIG. 4A depicts application icons displayed on the display of the processing system of FIG. 2 during a first time interval according to one or more embodiments described herein.

FIG. 4A depicts the display 206 of the processing system 200, the display 206 displaying, during a first time period 430, icons 401, 402, 403, 404. FIG. 4B depicts the display 206 of the processing system 200, the display 206 displaying, during a second time period 431, icons 401, 402, 404, 405. As is evident from the FIGS. 4A and 4B, the processing system 200 modifies a size and/or a position of the icons 401-405 of applications depending a current time compared to time periods. The modification of size and/or position of the icons 401-405 is based on usage information for the applications including when (i.e., during which time periods) the applications corresponding to the icons 401-405 are historically used.

One benefit of modifying the size and/or layout of icons of applications based on usage data for other applications of the same category is that icon size/layout for applications of other categories are not affected by the change in size/layout of the icons of applications of other categories. As an example, a most frequently used application for each of a plurality of categories can be displayed on one display 206, and shown in FIGS. 5A and 5B.

Figure 5B:
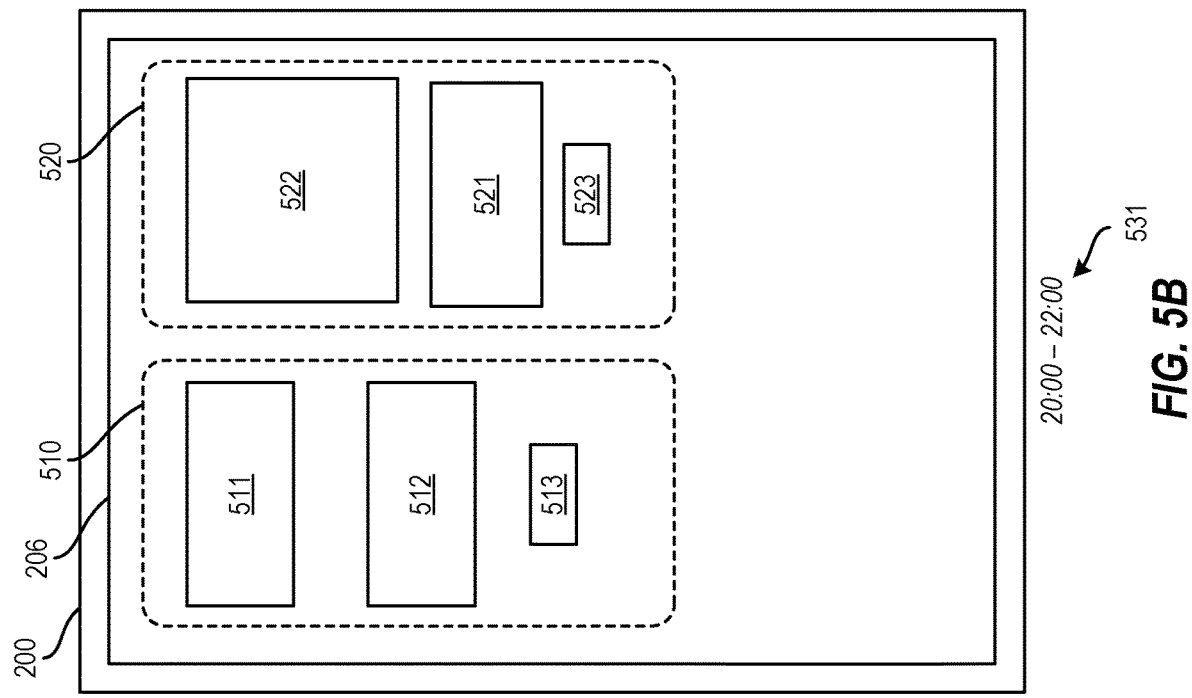
FIG. 5B depicts application icons displayed on the display of the processing system of FIG. 2 during a second time interval according to one or more embodiments described herein.
Figure 5A:
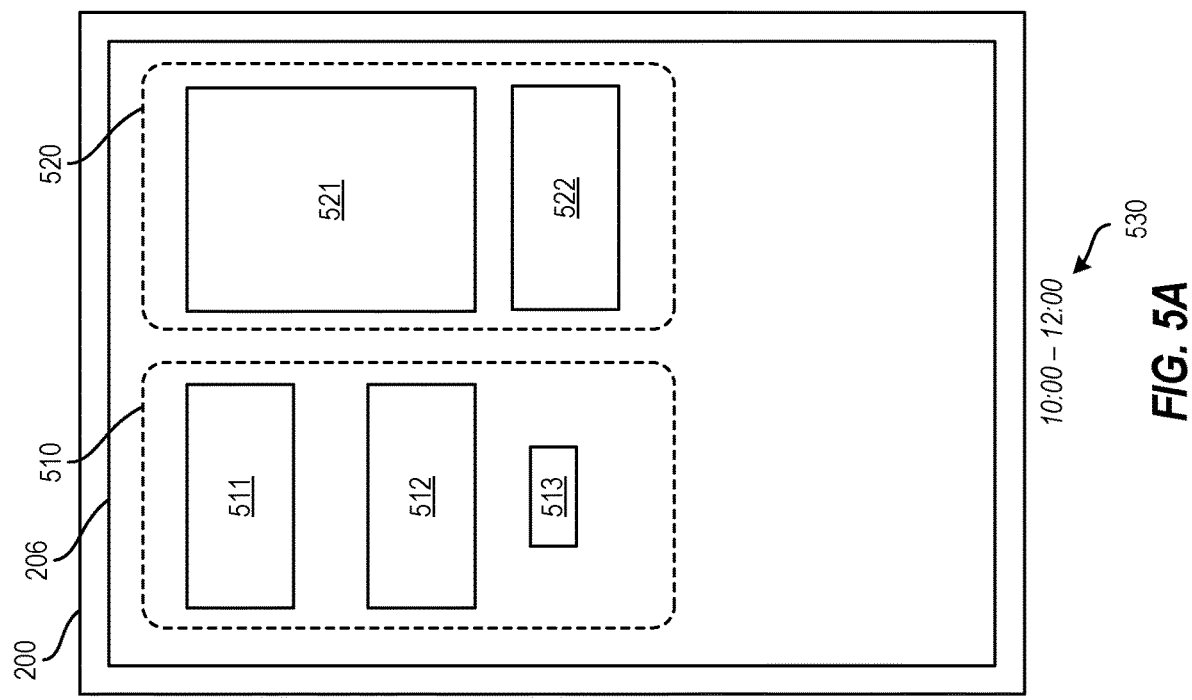
FIG. 5A depicts application icons displayed on the display of the processing system of FIG. 2 during a first time interval according to one or more embodiments described herein.

For example, FIG. 5A depicts the display 206 of the processing system 200, the display 206 displaying, during a first time period 530, icons 511, 512, 513 for applications of a first category 510 and icons 521, 522 for applications of a second category 520. FIG. 5B depicts the display 206 of the processing system 200, the display 206 displaying, during a second time period 531, icons 511, 512, 513 for applications of a first category 510 and icons 521, 522, 523 for applications of a second category 520.

The first category 510 can be any suitable category of applications, such as travel applications, social media applications, music applications, video applications, game applications, productivity applications, communication applications and the like. The second category 520 can be another category of any suitable category of applications, such as travel applications, social media applications, music applications, video applications, game applications, productivity applications, communication applications and the like.

As is evident, FIGS. 5A and 5B show that icons 521, 522, 523 for applications associated with the second category 520 can be modified (both in terms of size and layout position) relative to icons of other applications within the second category 520 based on a change in time (e.g., a change from the first time period 530 to the second time period 531). In this example, the icon 521 is larger than the icon 522 during the first time period 530. However, during the second time period 531, the icon 521 is smaller than the icon 522. The position of the icons 521, 522 also changes with respect to the change from the first time period 530 to the second time period 531. Additionally, the icon 523 appears during the second time period 531, which is not displayed during the first time period 530.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
in response to receiving usage information tor each application in a set of applications associated with a mobile device, identifying, by a processing device of a processing system, the usage information per application within predetermined time intervals;
determining, by the processing device, a relative order of each application within each of a plurality of application categories using predetermined ranges of the predetermined time intervals that a respective application was used;
in response to determining a particular time of day, modifying, by the processing device, a size of icons for display relative to other icons for applications within the application category to highlight applications within the application category according to the relative order; and
displaying, on a display of the processing system, icons of the set of applications within the application category using a modified size,
wherein a size of a first icon associated with a first application of the application category is proportionally larger than a size of a second icon associated with a second application of the application category relative to usage information for the first application compared to usage information for the second application,
wherein, responsive to the first application being used a percentage more often than the second application, the size of the first icon is the percentage larger than the size of the second icon, wherein the size of the first icon is modified based on a maximum icon size limit, and wherein the size of the second icon is modified based on a minimum icon size limit.

2. The computer-implemented method of claim 1, further comprising:

modifying a position of icons for display relative to other icons for applications within the application category.

3. The computer-implemented method of claim 2, wherein modifying the position of icons for display relative to other icons for applications within the application category occurs without modifying a position of icons for display of icons for applications within another application category.

4. The computer-implemented method of claim 1, wherein the application category is one of a travel application category, a social media application category, a music application category, a video application category, a game application category, a productivity application category, and a communication application category.

5. The computer-implemented method of claim 1, wherein modifying the size of icons for display relative to other icons for applications within the application category occurs without modifying a size of icons for display of icons for applications within another application category.

6. A system comprising:

a memory comprising computer readable instructions; and a processing device for executing the computer readable instructions for performing a method comprising:

in response to receiving usage information for each application in a set of applications associated with a mobile device, identifying, by a processing device of a processing system, the usage information per application within predetermined time intervals;

determining, by the processing device, a relative order of each application within each of a plurality of application categories using predetermined ranges of the predetermined time intervals that a respective application was used;

in response to determining a particular time of day, modifying, by the processing device, a size of icons for display relative to other icons for applications within the application category to highlight applications within the application category according to the relative order; and displaying, on a display of the processing system, icons of the set of applications within the application category using a modified size, wherein a size of a first icon associated with a first application of the application category is proportionally larger than a size of a second icon associated with a second application of the application category relative to usage information for the first application compared to usage information for the second application, wherein, responsive to the first application being used a percentage more often than the second application, the size of the first icon is the percentage larger than the size of the second icon, wherein the size of the first icon is modified based on a maximum icon size limit and, wherein the size of the second icon is modified based on a minimum icon size limit.

7. The system of claim 6, wherein the method further comprises: modifying a position of icons for display relative to other icons for applications within the application category.

8. The system of claim 7, wherein modifying the position of icons for display relative to other icons for applications within the application category occurs without modifying a position of icons for display of icons for applications within another application category.

9. The system of claim 6, wherein the application category is one of a travel application category, a social media application category, a music application category, a video application category, a game application category, a productivity application category, and a communication application category.

10. The system of claim 6, wherein modifying the size of icons for display relative to other icons for applications within the application category occurs without modifying a size of icons for display of icons for applications within another application category.

11. A computer program product comprising:

a computer readable storage medium having program instructions embodied therewith, the program instructions executable by a processing device to cause the processing device to perform a method comprising:

in response to receiving usage information for each application in a set of applications associated with a mobile device, identifying, by a processing device of a processing system, the usage information per application within predetermined time intervals;

determining, by the processing device, a relative order of each application within each of a plurality of application categories using predetermined ranges of the predetermined time intervals that a respective application was used;

in response to determining a particular time of day, modifying, by the processing device, a size of icons for display relative to other icons for applications within the application category to highlight applications within the application category according to the relative order; and displaying, on a display of the processing system, icons of the set of applications within the application category using a modified size, wherein a size of a first icon associated with a first application of the application category is proportionally larger than a size of a second icon associated with a second application of the application category relative to usage information for the first application compared to usage information for the second application, wherein, responsive to the first application being used a percentage longer than the second application, the size of the first icon is the percentage larger than the size of the second icon, wherein the size of the first icon is modified based on a maximum icon size limit and, wherein the size of the second icon is modified based on a minimum icon size limit.

12. The computer program product of claim 11, wherein the method further comprises:

modifying a position of icons for display relative to other icons for applications within the application category.

13. The computer program product of claim 12, wherein modifying the position of icons for display relative to other icons for applications within the application category occurs without modifying a position of icons for display of icons for applications within another application category.

14. The computer program product of claim 11, wherein the application category is one of a travel application category, a social media application category, a music application category, a video application category, a game application category, a productivity application category, and a communication application category.

15. The computer program product of claim 11, wherein modifying the size of icons for display relative to other icons for applications within the application category occurs without modifying a size of icons for display of icons for applications within another application category.

\* \* \* \* \*